United States Patent [19]

Hitch et al.

[11] Patent Number: 4,495,860
[45] Date of Patent: Jan. 29, 1985

[54] FOOD GRILLING, ROASTING, SMOKING AND STEAMING APPARATUS

[75] Inventors: Robert J. Hitch; Mason Holland, both of Columbus, Ga.

[73] Assignee: W. C. Bradley Enterprises, Inc., Columbus, Ga.

[21] Appl. No.: 587,553

[22] Filed: Mar. 8, 1984

[51] Int. Cl.³ .............................................. A47J 37/04
[52] U.S. Cl. ........................................ 99/340; 99/352; 99/417; 99/448; 99/482; 126/9 R
[58] Field of Search ................ 99/340, 343, 448, 416, 99/417, 446, 352, 482; 126/9 R, 25 R, 275 R, 273 R; 426/523

[56] References Cited
U.S. PATENT DOCUMENTS

| | | | |
|---|---|---|---|
| 3,049,071 | 8/1962 | Diack | 99/340 |
| 3,299,800 | 1/1967 | Angelo | 99/417 |
| 3,333,526 | 8/1967 | Kirkpatrick | 99/446 X |
| 3,776,127 | 12/1973 | Muse | 99/482 |
| 4,020,322 | 4/1977 | Muse | 99/482 X |
| 4,094,295 | 6/1978 | Boswell | 126/25 R |
| 4,300,444 | 11/1981 | Muse | 99/448 |

Primary Examiner—Billy J. Wilhite
Attorney, Agent, or Firm—Newton, Hopkins & Ormsby

[57] ABSTRACT

A more convenient and versatile charcoal fired cooking apparatus is disclosed. A free-standing charcoal and water pan assembly having support legs allows lifting off of the body or shell of the cooker together with two food support racks held on brackets thereof. The water pan is also liftable from the legs of the free-standing assembly to enable direct grilling of food when desired. A removable dome rests on the top edge of the cooker body.

7 Claims, 4 Drawing Figures

FOOD GRILLING, ROASTING, SMOKING AND STEAMING APPARATUS

BACKGROUND OF THE INVENTION

Charcoal fired cookers having grilling, steaming and smoking capabilities are known in the prior art exemplified by U.S. Pat. Nos. 3,299,800; 3,776,127; 4,094,295; and 4,300,444. The prior art cookers of this type have some deficiencies, mainly in terms of lacking the degree of convenience of use and simplicity of construction demanded by the average user. Accordingly, it is the objective of the present invention to provide a cooking apparatus of the mentioned type of greater simplicity of construction and convenience of use compared to the prior art, and also possessing greater versatility in terms of diverse operations, namely, grilling, roasting, steaming and smoking of meat products and the like.

The present invention achieves its primary objectives of greater convenience of use and greater versatility through provision of a self-standing charcoal pan and water pan assembly having support legs for both pans, and from which legs the water pan is readily liftable to enable direct fire grilling of foods. The same support legs form a base for a cylindrical body or shell of the cooker which contains two food racks at different elevations in the shell, the racks being supported on bracket elements attached to the shell side wall. The shell containing the two food racks can be lifted easily from the legs of the self-standing charcoal pan and water pan assembly to allow ready access to both pans and to allow quick removal of foods from the two racks within the shell. The arrangement greatly increases the convenience of use of the cooking apparatus and adds to its versatility of usage.

Other aspects and advantages of the invention will be made apparent to those skilled in the art during the course of the following detailed description.

DETAILED DESCRIPTION

Figure 1:
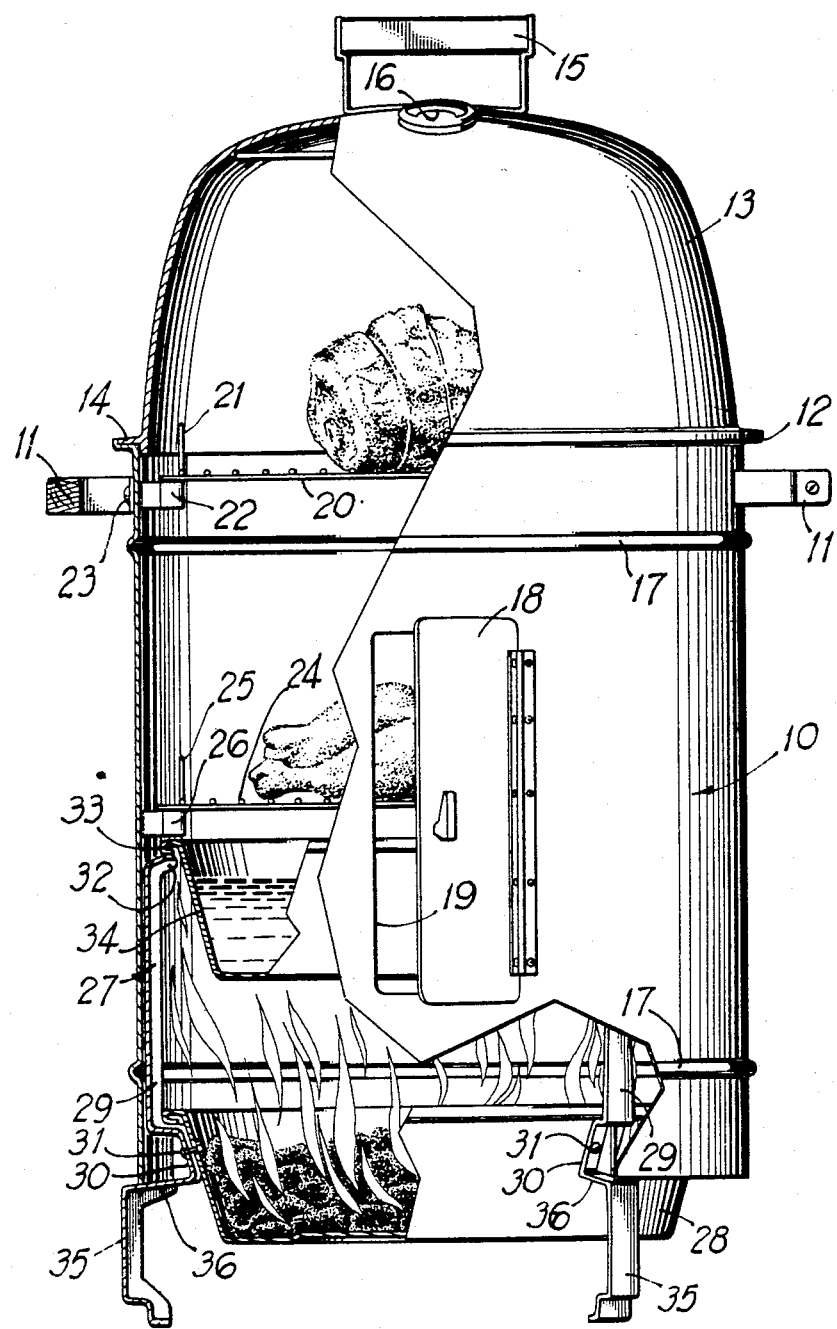
FIG. 1 is a side elevation, partly in vertical cross section, showing a cooking apparatus according to the present invention.
Figure 2:
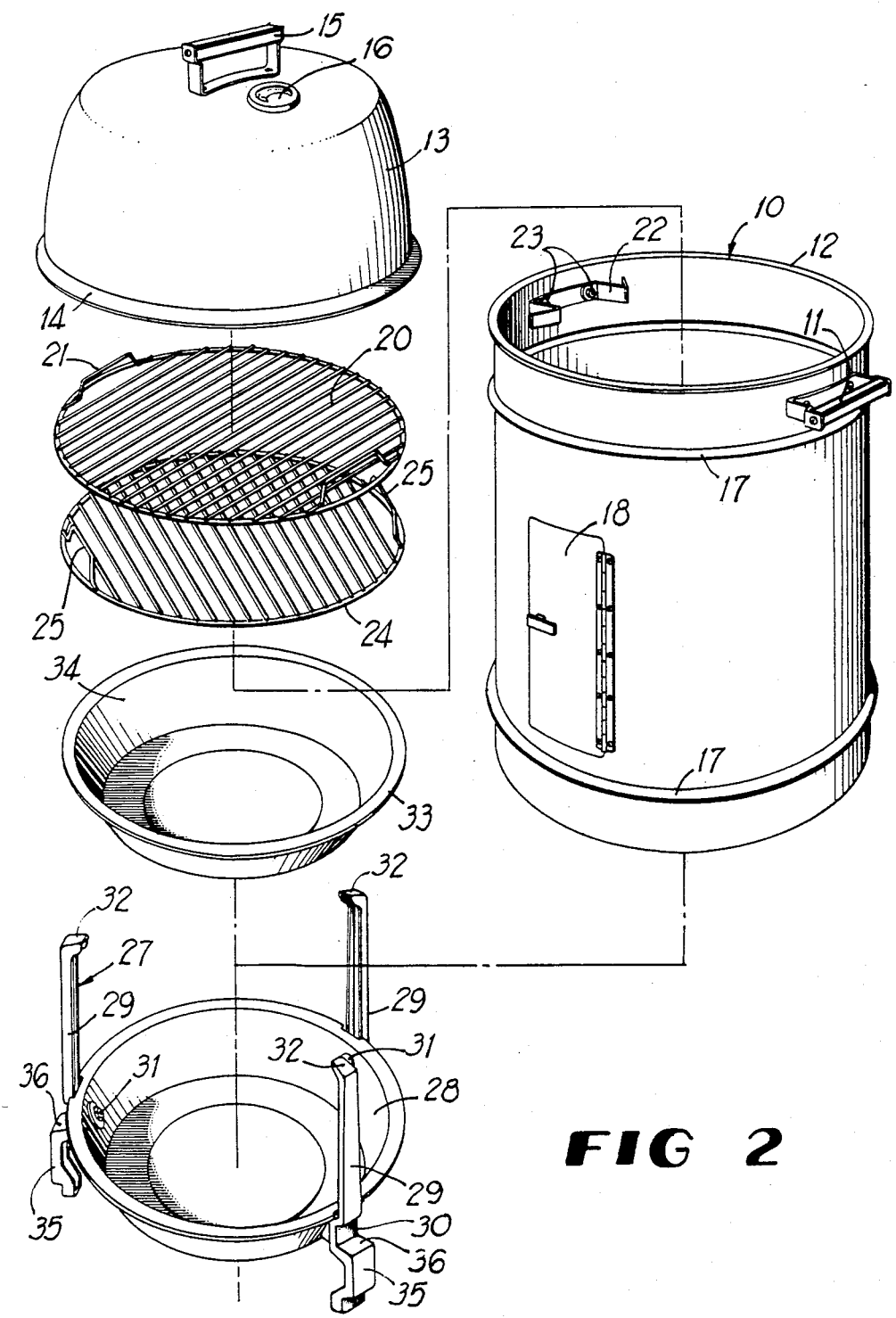
FIG. 2 is an exploded perspective view of the apparatus.
Figure 3:
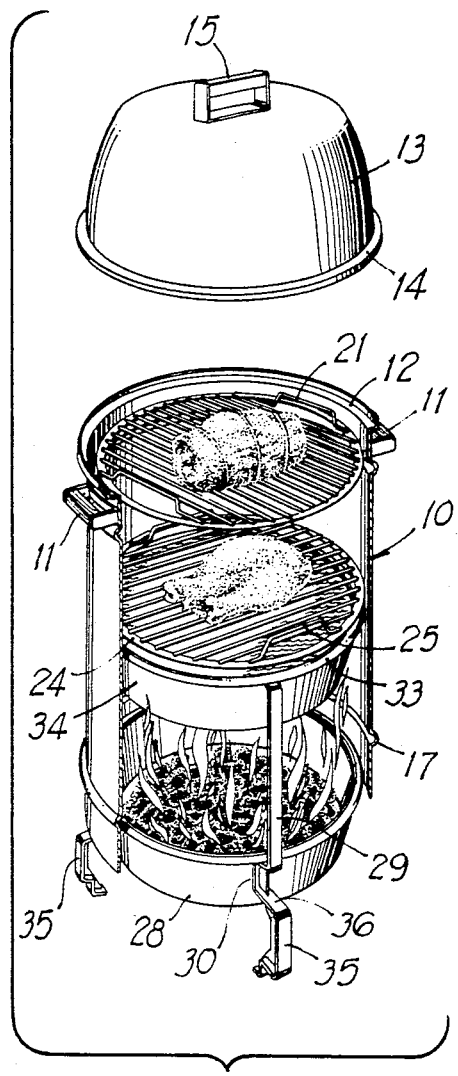
FIG 3. is a partly exploded perspective view, with parts in cross section.

Referring to the drawings in detail wherein like numerals designate like parts, a food cooking apparatus according to the present invention includes a cylindrical body portion or shell 10 which is open-ended and has insulated lifting handles 11 near its top on diametrically opposite sides thereof. The shell 10 has a top annular flange 12 for the support and centering of a removable dome 13 having a lower end support flange 14 which is engageable with the shell flange 12, as shown. The dome 13 has a top insulated lifting handle 15 and may be equipped with a temperature indicator 16. The shell 10 preferably has stiffening beads 17 near and spaced from its top and bottom ends. The shell also has a vertically elongated hinged access door 18 adapted to cover an access opening 19 which extends for a major portion of the height of the shell to provide ready access to water and charcoal pans, yet to be described.

Figure 4:
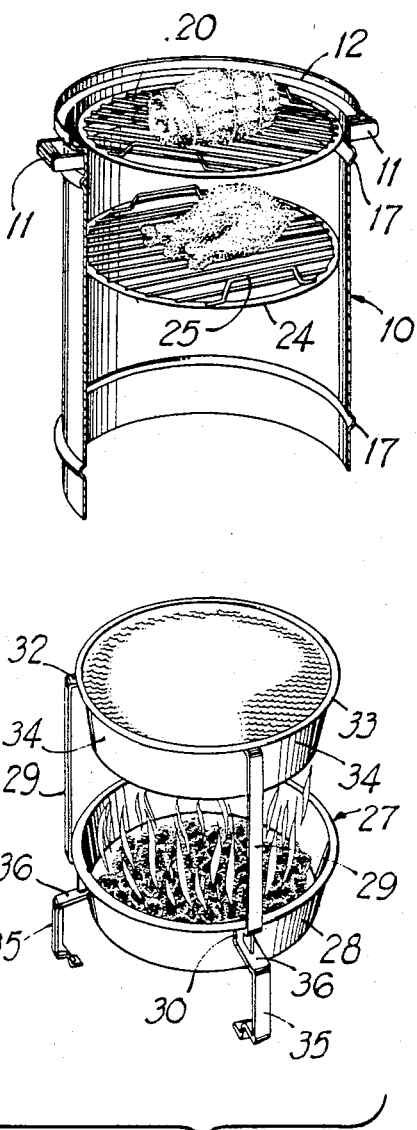
FIG. 4 is an exploded perspective view of components of the apparatus.

Readily removably mounted within the shell 10 slightly below its top edge is a first heavy wire food support rack 20 having lifting handles 21. This rack rests on a pair of diametrically opposed internal rack support brackets 22 which are secured to the shell side wall by the same fasteners 23 which secure the two handles 11. At a lower elevation in the shell 10 preferably at its vertical center, a second food support rack 24 having lifting handles 25 rest removably on a second pair of support brackets 26 secured to the shell side wall. As depicted in FIG. 4, the arrangement enables lifting of the shell 10 and its racks 20 and 24 as a unit from the remainder of the cooking apparatus.

The apparatus further embodies a self-standing water and charcoal pan assembly 27 in accordance with a main feature of the invention. This assembly comprises a charcoal pan 28 large enough to hold ten pounds of charcoal and having attached thereto at three circumferentially equidistantly spaced points sturdy support legs 29. Intermediate inset portions 30 of these legs are fixed by fasteners 31 to the conical side wall of the charcoal pan 28. The legs 29 rise vertically above the pan 28 to an elevation near and below rack support brackets 26, where the legs terminate in short inwardly projecting extensions 32 on which the rim 33 of a readily liftable water pan 34 rests. The water pan is thus supported in spaced superposed relationship to the charcoal pan, the latter being at the bottom of the shell 10 and the former being near and below the vertical center of the shell.

The lower portions 35 of legs 29 are outwardly offset relative to the shell 10 to form generally level shoulders 36 on which the shell 10 rests and from which the shell is freely liftable at desired times by use of its handles 11.

The construction of the cooking apparatus is simplified and compact and its use is highly convenient.

For example, with the apparatus assembled as in FIG. 1 and charcoal in the pan 28 ignited and burning, water held in the pan 34 is boiled and converted into steam which can mix with smoke and rise within the shell 10 toward the closed dome 13. A food product on the lower rack 24 will be slowly and evenly cooked by a steaming/roasting process along with smoke treatment. Simultaneously, another food item on the upper rack 20, which may be cooked or partly cooked, is subjected to smoking and gentle steaming to a desired temperature.

The access door 18 allows inspection and replenishing of water and charcoal during the cooking process.

When desired, according to a main convenience feature of the invention, FIG. 4, the entire shell 10 along with the two racks 20 and 24 can be lifted as a unit from the pan assembly 27 and set aside at a convenient location. The racks 20 and 24 are independently liftable out of the shell 10, as required. When the shell is thus lifted, the pan assembly 27 stands alone and is easy to service. Furthermore, the water pan 34 can be lifted off of the legs 29 and set aside, following which the shell 10 can be repositioned on the leg shoulders 36. This facilitates direct fire grilling of foods on the lower rack 24 without the water pan being present. It can be seen that the structural arrangement of the apparatus renders it highly versatile in its usage as well as very convenient. The advantages of the device over the prior art should be apparent to those skilled in the art without the necessity for further description herein.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A cooking apparatus comprising a shell having lifting handles, a removable dome for the shell, spaced superposed food racks liftably positioned within the shell, the shell having an upright axis in use and being open-ended, and a coacting charcoal pan and water pan assembly including support legs to which a charcoal pan is fixed and upon which a water pan is freely liftably mounted in spaced superposed relationship to the charcoal pan, said charcoal pan and water pan assembly being free-standing, and the legs of said assembly having support shoulders upon which the shell may rest and be supported with its lower portion in surrounding relationship to said charcoal and water pans and with a lowermost food rack of the shell disposed near and above the top of the water pan, said shell and food racks being liftable as a unit from the charcoal pan and water pan assembly to fully expose the latter.

2. A cooking apparatus comprising an upright axis cylindrical shell which is open-ended and having a pair of opposite side lifting handles near its top, a removable cover for the top of said shell adapted to rest on the top of the shell, vertically spaced food rack support elements in the shell near its top and near its vertical center, independently liftable food racks in the shell resting on said support elements, a charcoal pan and a spaced superposed water pan, circumferentially spaced legs secured to the charcoal pan and extending therebelow and also extending thereabove and having top terminals on which the water pan is freely liftably mounted, and support shoulders on said legs somewhat above their lower ends and adjacent to the charcoal pan and extending radially of the charcoal pan and said top terminals of the legs, whereby the lower end of the shell may be telescoped over said legs and pans to rest solidly on said support shoulders with the food rack near the vertical center of the shell arranged near and above the top of the water pan.

3. A cooking apparatus as defined in claim 2, and the shell having a vertically elongated access opening in it side wall and a door for said access opening.

4. A cooking apparatus comprising a free-standing assembly consisting of circumferentially spaced support legs, a charcoal pan united with said support legs near and above their lower ends and a water pan freely removably mounted on the support legs above the elevation of said charcoal pan, said support legs being formed to provide support shoulders at a common elevation radially outwardly of said pans, and a tubular shell for the apparatus containing food rack means engaged telescopically over the tops of said legs and over said pans in surrounding relationship thereto, and the lower edge of said shell resting removably on said support shoulders.

5. A cooking apparatus as defined in claim 4, and a removable top cover for said shell.

6. A cooking apparatus as defined in claim 5, and a pair of opposite side lifting handles on said shell.

7. A cooking apparatus as defined in claim 6, and said shell having a side wall access opening and a closure element for said opening near the elevation of said water pan.

* * * * *